US010230630B2

(12) United States Patent
Holcombe et al.

(10) Patent No.: US 10,230,630 B2
(45) Date of Patent: Mar. 12, 2019

(54) DETERMINING NETWORK RANK FOR COMMUNICATION TO NEIGHBORING NODES

(71) Applicant: Landis+Gyr Innovations, Inc., Alpharetta, GA (US)

(72) Inventors: Michael Sean Holcombe, Roswell, GA (US); Christopher Sean Calvert, Roswell, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 79 days.

(21) Appl. No.: 15/252,514

(22) Filed: Aug. 31, 2016

(65) Prior Publication Data

US 2017/0099218 A1    Apr. 6, 2017

Related U.S. Application Data

(60) Provisional application No. 62/236,406, filed on Oct. 2, 2015.

(51) Int. Cl.
*H04L 12/721* (2013.01)
*H04L 12/753* (2013.01)
(Continued)

(52) U.S. Cl.
CPC .............. *H04L 45/70* (2013.01); *H04L 12/44* (2013.01); *H04L 45/02* (2013.01); *H04L 45/123* (2013.01);
(Continued)

(58) Field of Classification Search
CPC ......... H04L 45/70; H04L 45/02; H04L 45/22; H04L 12/44
(Continued)

(56) References Cited

U.S. PATENT DOCUMENTS

2007/0010271 A1\* 1/2007 Roy ...................... H04W 24/00
455/517
2007/0183330 A1\* 8/2007 Salt ..................... H04L 41/0213
370/235
(Continued)

FOREIGN PATENT DOCUMENTS

WO    2017058547    4/2017

OTHER PUBLICATIONS

The Minimum Rank with Hysteresis Objective Function, Internet Engineering Task Force (IETF), O. Gnawali University of Houston P. Levis Stanford University, Sep. 11, 2012, pp. 1-13.
(Continued)

*Primary Examiner* — Peter G Solinsky
(74) *Attorney, Agent, or Firm* — Kilpatrick Townsend & Stockton LLP (57) ABSTRACT

The determination and advertisement of a node's rank in an RF mesh network reflects sustained network changes. A node's advertised rank may be based on the node's induced rank and a previous rank candidate. Induced rank is the rank of the node at a particular point in time. Rank candidate is based on a running average of the node's past rank. The advertised rank may be based on a weighted sum of the induced rank and a previous rank candidate. Induced rank may consider a Link Quality Indicator (LQI), which may be based on a running average LQI.

20 Claims, 6 Drawing Sheets

(51) Int. Cl.
    *H04L 12/44*     (2006.01)
    *H04L 12/751*     (2013.01)
    *H04L 12/707*     (2013.01)
    *H04W 40/02*     (2009.01)
    *H04W 84/18*     (2009.01)

(52) U.S. Cl.
    CPC .............. *H04L 45/22* (2013.01); *H04L 45/48* (2013.01); *H04W 40/02* (2013.01); *H04W 84/18* (2013.01)

(58) Field of Classification Search
    USPC ........................................................ 370/254
    See application file for complete search history.

(56) References Cited

U.S. PATENT DOCUMENTS

2011/0019565 A1*   1/2011   Nezou .................. H04W 40/02
                                                              370/252

2011/0195708 A1*   8/2011   Moberg ............ H04W 36/0094
                                                              455/424
2013/0191688 A1*   7/2013   Agarwal ............. H04L 41/0873
                                                               714/32

OTHER PUBLICATIONS

Cacciapuoti et al., Link quality estimators for multi-hop mesh network, 2014 Euro Med Telco Conference (EMTC), Nov. 12, 2014, pp. 1-6.
International Application No. PCT/US2016/052444, International Search Report and Written Opinion dated Jan. 4, 2017, 15 pages.
Vasseur et al., Routing Metrics Used for Path Calculation in Low-Power and Lossy Networks, Internet Engineering Task Force, IETF, Mar. 26, 2012, pp. 1-30.
Winter et al., RPL: IPv6 Routing Protocol for Low-Power and Lossy Networks, Internet Engineering Task Force, IETF, Mar. 26, 2012, pp. 1-157.

\* cited by examiner

DETERMINING NETWORK RANK FOR COMMUNICATION TO NEIGHBORING NODES

This application claims priority to U.S. Provisional Patent Application No. 62/236,406 filed on Oct. 2, 2015, entitled "Maintaining Performance and Stability in a Mesh Network," which is incorporated herein in its entirety by reference.

BACKGROUND

Network rank is a quantification of the quality of a node's connection to a root node. A node's network rank may be advertised to its neighbors and used by the neighbors to evaluate the node as a potential parent. A node's rank is based on the number of hops required to reach the root node and other factors, such as the quality of the links between nodes.

When a node's advertised rank fluctuates in real time, a network may become unstable. Brief aberrations in network quality may cause a node to select a parent based on aberrant data or may impact its advertised rank. Frequent changes in advertised rank may cause nodes to frequently change parents which may lead to instability in the network.

It is desirable to have a system that incorporates gradual changes to the rank advertised by a node. Such a system would minimize the impact of temporary fluctuations in rank to provide for greater network stability, while still being responsive to persistent changes in rank.

SUMMARY

The present invention provides a method for calculating and advertising a rank that reflects changes in the network but ignores transitory anomalies. The advertised rank is based on the induced rank of the node and the previously advertised rank. The induced rank is the node's rank at a point in time and is based on the parent node's rank and the quality of the link between the node and the parent node. A weighted running average or rank candidate is used to determine the advertised rank. In one example, the rank candidate is the weighted sum of the previous rank candidate value and the induced rank and is calculated each time the node advertises its rank. In this manner, only a sustained move to a new induced rank will result in a new advertised rank. This will result in a more stable network.

Once the rank candidate is calculated, the difference between the rank candidate and a neighboring rank is determined. A neighboring rank is a rank value that is one step in rank value higher or lower than the previously advertised rank. When the difference between the rank candidate and the closest neighboring rank is within a rank threshold, the advertised rank is set to the neighboring rank value. When the difference between the rank candidate and the neighboring rank is greater than the rank threshold, the advertised rank is set to the previous advertised rank. The advertised rank is communicated to the other nodes.

A Link Quality Indicator (LQI) may reflect the quality of the link between the node and the parent node. The value of the LQI may result in an LQI adjustment to the induced rank. The value of the LQI may be calculated using a running average to account for differences in the number of packets received by the node.

These and other features, aspects, and advantages of the present disclosure are better understood when the following Detailed Description is read with reference to the accompanying drawings.

DETAILED DESCRIPTION

Aspects of the invention support determining the rank advertised by a node so that the advertised rank reflects persistent changes in the network. A node's advertised rank may be based on the node's induced rank and a previous rank candidate. Induced rank is the rank of the node at a particular point in time. Rank candidate is based on a running average of the node's past rank. In one implementation, the advertised rank is based on a weighted sum of the induced rank and a previous rank candidate. When determining its induced rank, the node may consider the quality of its connection to its parent using a Link Quality Indicator (LQI). The LQI may be based on the average LQI over a time period, as well as a running average LQI. In one implementation, the LQI is a weighted sum of the average LQI over a time period and a previous running average LQI.

Exemplary Operating Environment

Figure 1:
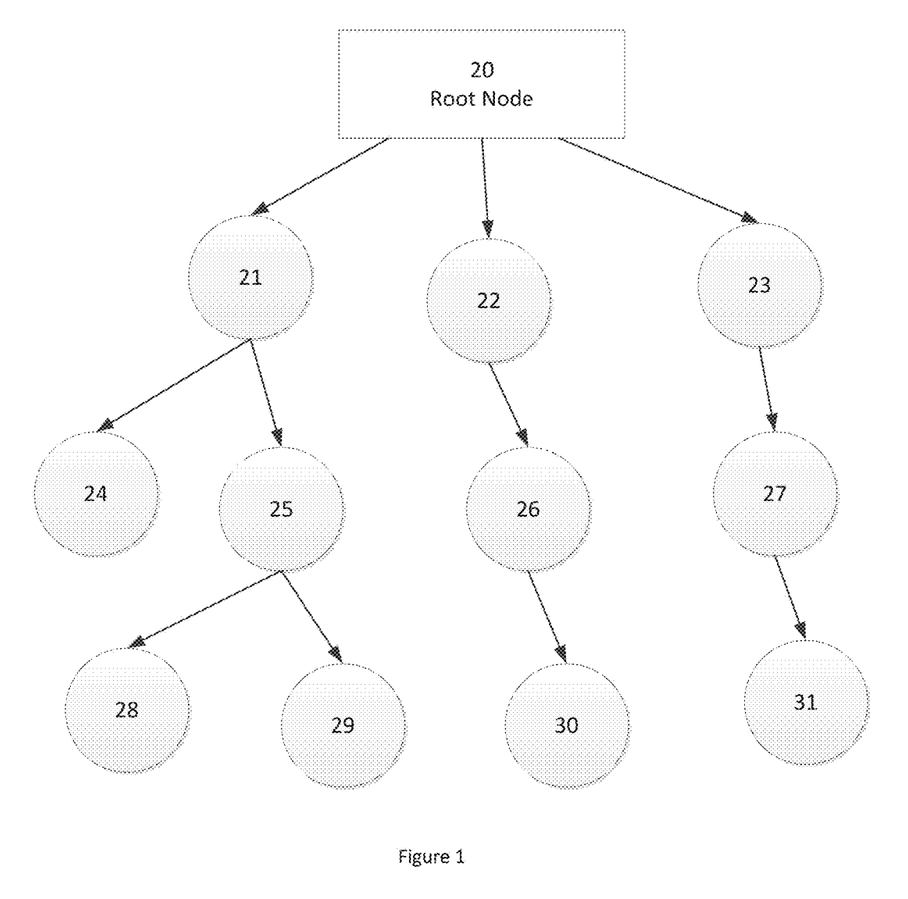
FIG. 1 is a block diagram illustrating a portion of an exemplary RF mesh network.

FIG. 1 is a diagram illustrating a portion of an exemplary RF mesh network. The nodes of the network may be configured to transmit and receive communications, as well as relaying communications for other nodes. The network may utilize the RPL routing protocol so that each node advertises its network rank to neighboring nodes.

The network includes a root node 20. The network also includes a number of additional nodes, illustrated here as nodes 21-31. The root node 20 may communicate with additional nodes outside of the network depicted in FIG. 1. Although FIG. 1 depicts a single root node and eleven additional nodes for illustrative purposes, the RF mesh network can include any number of root nodes and any number of additional nodes. FIG. 1 illustrates a number of parent-child relationships. For example, root node 20 is the parent node for nodes 21, 22, and 23. A node may be both a parent and a child. For example, node 22 is a child of root node 20 and is also a parent of node 26. A parent node is a node that is between the root node and the child node and that communicates directly with the child node. The child node will periodically re-evaluate its parent node and may select a new parent node if the new parent node provides a better quality connection to the root node. In one non-limiting example, root node 20 is a collector for an AMI network and nodes 21-31 include metering devices for measuring resource consumption at different premises.

Figure 2:
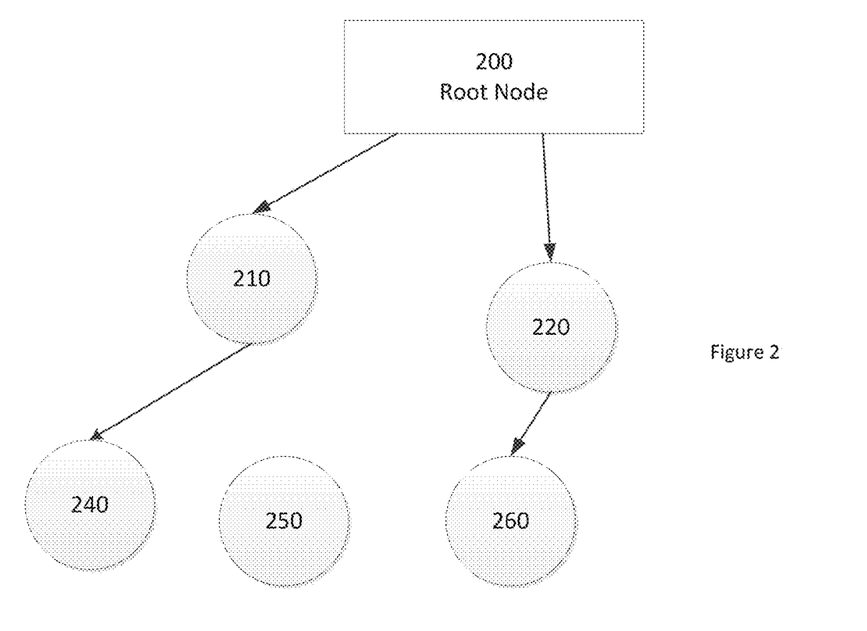
FIG. 2 is a block diagram illustrating the selection of a parent node.

FIG. 2 illustrates the selection of a parent node by node 250. The portion of the network shown in FIG. 2 includes root node 200 and nodes 210, 220, 240, 250, 260. Node 250 selects a parent node to minimize its own rank. In the following examples, rank is expressed in the form of binary numbers, or multiples of 256. Rank may also be expressed in the form of hexadecimal numbers, or multiples of 100. Other numbering systems may also be used.

To select a parent node, node 250 considers the advertised rank of its neighboring nodes and the link quality between it and each neighboring node. Node 250 maintains LQI information for its neighboring nodes based on its communications with the nodes. The LQI may result in one or more rank values being added to the rank calculation as an LQI adjustment. In one implementation, when the LQI is below a threshold, indicating that the link quality is good, then the LQI adjustment is zero, when the LQI is between a first value and the threshold, indicating that the link quality is fair, one rank value may be added, and when the LQI is above the first value, indicating that the link quality is poor, two rank values may be added.

Returning to FIG. 2, assume the advertised rank of node 210 is 256, the advertised rank of node 220 is 256, the advertised rank of node 240 is 512, and the advertised rank of node 260 is 512. Also assume that the LQI between nodes 210 and 250 is above the first value, the LQI between nodes 240 and 250 is between the first value and the threshold, the LQI between nodes 220 and 250 is above the first value, and the LQI between nodes 250 and 260 is below the threshold. Node 250 may consider nodes 210, 220, 240, and 260 as potential parent nodes and select the one that provides node 250 with the lowest rank.

To compare the potential parent nodes, node 250 may determine the impact of the selection of the different potential parent nodes on its rank. If node 250 selects node 210 as its parent, then its rank is 1024 (advertised rank of node 210+2 rank values for LQI adjustment+1 rank value for one hop). If node 250 selects node 240 as its parent, then its rank is 1024 (advertised rank of node 240+1 rank value for LQI adjustment+1 rank value for one hop). If node 250 selects node 220 as its parent, then its rank is 1024 (advertised rank of node 220+2 rank values for LQI adjustment+1 rank value for one hop). If node 250 selects node 260 as its parent, then its rank is 768 (advertised rank of Node 260+no LQI adjustment+1 rank value for one hop). Since node 250 is seeking to minimize its own rank, it selects node 260 as its parent.

In another example, assume the advertised rank of node 210 is 256, the advertised rank of node 220 is 512, the advertised rank of node 240 is 512, and the advertised rank of node 260 is 768. Also assume that the LQI between nodes 210 and 250 is above the first value, the LQI between nodes 240 and 250 is between the first value and the threshold, the LQI between nodes 220 and 250 is below the threshold, and the LQI between nodes 250 and 260 is below the threshold.

In this example, if node 250 selects node 210 as its parent, then its rank is 1024 (advertised rank of node 210+2 rank values for LQI adjustment+1 rank value for one hop). If node 250 selects node 240 as its parent, then its rank is 1024 (advertised rank of node 240+1 rank value for LQI adjustment+1 rank value for one hop). If node 250 selects node 220 as its parent, then its rank is 768 (advertised rank of node 220+no LQI adjustment+1 rank value for one hop). If node 250 selects node 260 as its parent, then its rank is 1024 (advertised rank of node 260+no LQI adjustment+1 rank value for one hop). Since node 250 is seeking to minimize its own rank, it selects node 220 as its parent.

A node selects only one parent node. If there are multiple potential parent nodes that result in the same rank for the node, then the node may give one of the factors used to determine its rank more weight. One option is to select the potential parent having the fewest number of hops to the root. Another option is to select the potential parent with the best LQI. Other options may use multiple factors or different factors to select one of the nodes as its parent when there is no difference in rank for the node.

In another example, assume the advertised rank of node 210 is 256, the advertised rank of node 220 is 256, the advertised rank of node 240 is 512, and the advertised rank of node 260 is 512. Also assume that the LQI between nodes 210 and 250 is between the threshold and the first value, the LQI between nodes 240 and 250 is below the threshold, the LQI between nodes 220 and 250 is above the first value, and the LQI between nodes 250 and 260 is between the threshold and the first value.

In this example, if node 250 selects node 210 as its parent, then its rank is 768 (advertised rank of node 210+1 rank values for LQI adjustment+1 rank value for one hop). If node 250 selects node 240 as its parent, then its rank is 768 (advertised rank of node 240+no LQI adjustment+1 rank value for one hop). If node 250 selects node 220 as its parent, then its rank is 1024 (advertised rank of node 220+2 rank values for LQI adjustment+1 rank value for one hop). If node 250 selects node 260 as its parent, then its rank is 1024 (advertised rank of node 260+1 rank value for LQI adjustment+1 rank value for one hop). In this example, nodes 210 and 240 result in the same rank for Node 250. If the criteria for selecting a parent node includes minimizing the number of hops to the root, then node 250 selects node 210 as its parent. The node may determine the number of hops to the root using a routing metric, such as the Hop Count Object defined by the RPL specification. If the criteria for selecting a parent node includes the best LQI between the parent and child, then node 250 selects node 240 as its parent.

A node's rank is dynamic and may change as the rank of its parent or the LQI between it and its parent changes. The term induced rank as used herein, refers to the node's rank at a particular time. It is based on the advertised rank of the parent node, plus one rank value for the hop from the parent node to the child, plus any LQI adjustment for the link between the parent node and the child node.

A node advertises its rank to its neighboring nodes. To improve network stability, a node may advertise a rank referred to herein as its advertised rank that may be different than its induced rank. In one example, the advertised rank is calculated and sent out in a DIO (DODAG Information Object) message as defined by the RPL specification. The frequency of the transmission of the DIO message is variable. In one example, the DIO is sent approximately once per hour, but it may be sent more frequently after a network change. In a mesh network, the DIO may be broadcast to the other nodes in the network. In one exemplary system, the frequency of the calculation of the induced rank is independent of the frequency of the transmission of the advertised rank. When the network or the particular node is initialized, the advertised rank is set to be equal to the induced rank. Subsequently, the advertised rank is determined as described below.

Exemplary Method for Determining Advertised Rank

Figure 3:
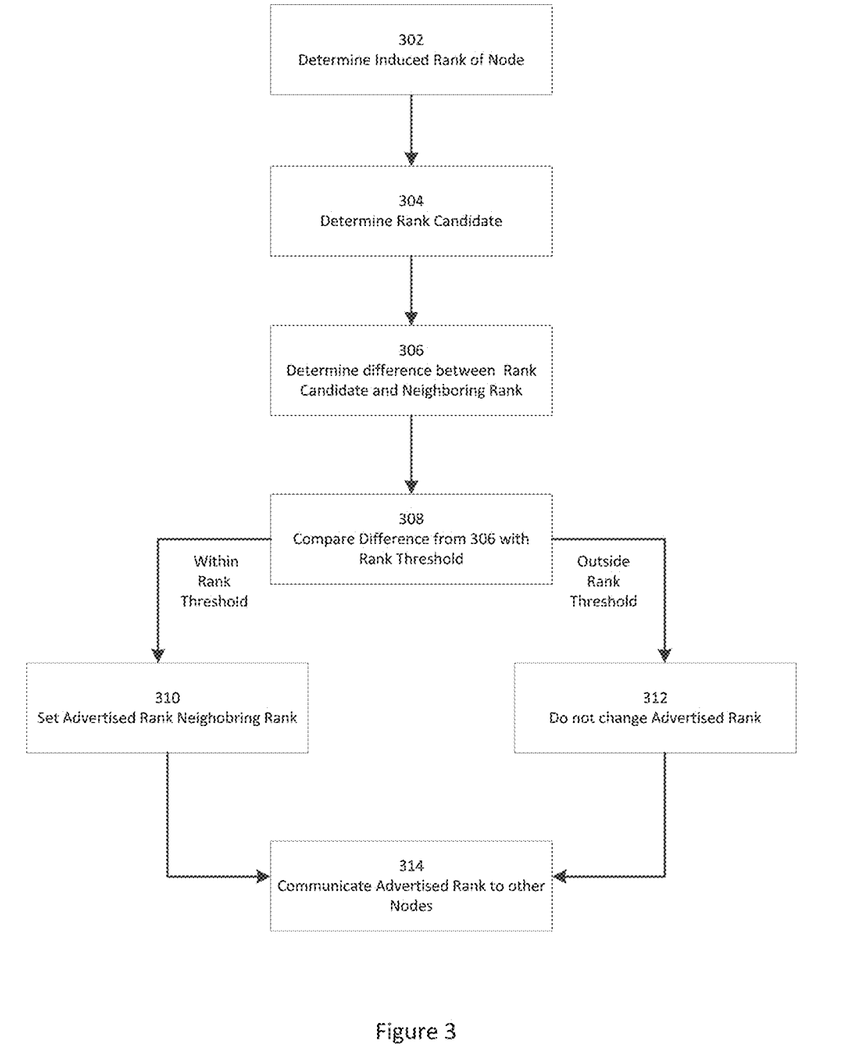
FIG. 3 is a flowchart illustrating an exemplary method of adjusting the advertised rank.

Rank Candidate=(¾*previous Rank Candidate)+
(¼*current Induced Rank).

The rank candidate is determined each time the node advertises its rank.

In 306, the difference between the rank candidate and a neighboring rank is determined. A neighboring rank is a rank value that is one step in rank value higher or lower than the previously advertised rank. For example, if the previously advertised rank is 768, the neighboring rank values are 512 and 1024. The difference between the rank candidate and the closest neighboring rank is compared to a threshold, referred to herein as a rank threshold, in 308. The rank threshold is configurable, and may vary according to the installation. The rank threshold may be the same for all nodes throughout the network. In one example, the rank threshold is set to approximately 10% of one rank value.

When the difference between the rank candidate and the neighboring rank is within, or less than, the rank threshold, the process continues to 310 and the advertised rank is set to the neighboring rank value. In one example, the rank candidate value is also set to the advertised rank value, for the purpose of calculating the rank candidate in the next iteration.

When the difference between the rank candidate and the neighboring rank is greater than the rank threshold, the process continues to 312 and the advertised rank is set to the previous advertised rank.

After the advertised rank has been set at 310 or 312, the process continues to 314, where the advertised rank is communicated to the other nodes.

Figure 4:
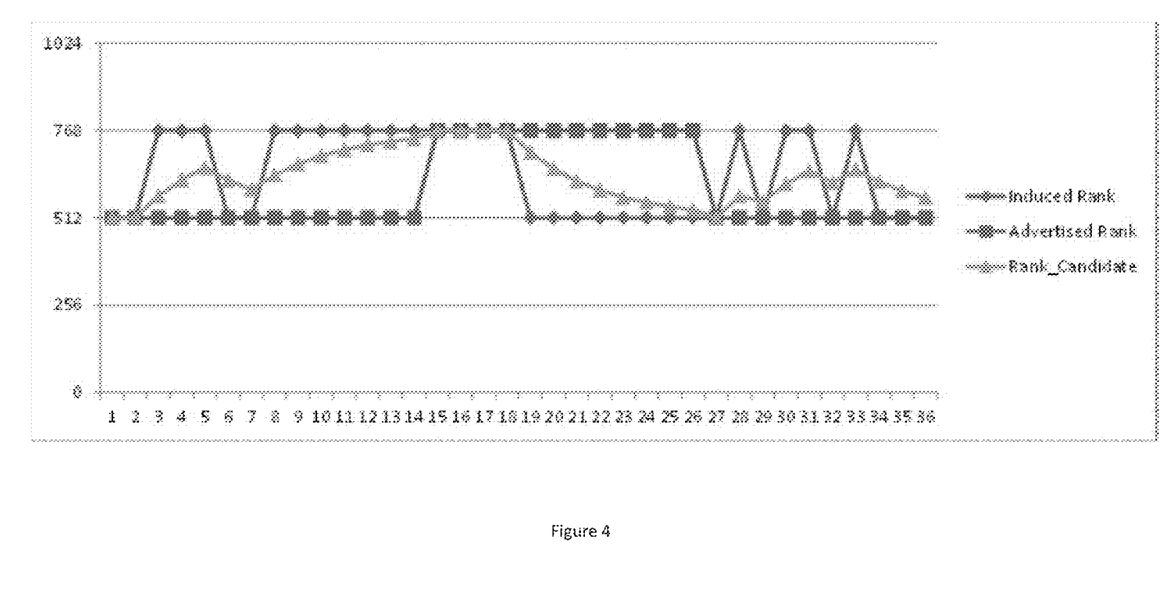
FIG. 4 is a graph showing gradual changes in advertised rank.

FIG. 4 illustrates how the advertised rank may change over time and how the advertised rank relates to the induced rank. The y-axis represents the rank value. The x-axis represents sequential time periods at which the advertised rank is determined. In one implementation the advertised rank is determined whenever the node transmits a DIO message. Although the divisions along the x-axis are shown as being equally spaced, the time between communications may vary. For the purposes of illustration, one rank value is 256 and the rank threshold is 20.

At time 1 and time 2, the advertised rank, the induced rank, and the rank candidate are all 512. At time 3, the induced rank is 768. The rank candidate may be calculated using the equation provided above. If so, then the rank candidate is 576 (0.75(previous rank candidate of 512)+0.25 (induced rank of 768)). The rank candidate is compared to the neighboring rank, 768. Since the difference between the rank candidate (576) and the neighboring rank (768) is greater than the rank threshold (192>20), the advertised rank is set to be the previous advertised rank or 512.

At time 14, the advertised rank is 512, the rank candidate is 744, and the induced rank is 768. At time 15, the induced rank is 768. The rank candidate may be calculated using the equation provided above. If so, then the rank candidate is 750 (0.75(previous rank candidate of 744)+0.25(induced rank of 768)). Since the difference between the rank candidate (750) and the neighboring rank (768) is within the rank threshold (18<20), the advertised rank is set to a new rank value of 768.

At time 18, the advertised rank, the rank candidate, and the induced rank are all 768. At time 19, the induced rank is 512. The rank candidate may be calculated using the equation provided above. If so, then the rank candidate is 704 (0.75(previous rank candidate of 768)+0.25(induced rank of 512)). Since the difference between the rank candidate (704) and the neighboring rank (512) is greater than the rank threshold (192>20), the advertised rank is set to the previous advertised rank of 768.

At time 26, the advertised rank is 768, the rank candidate is 520, and the induced rank is 512. At time 27, the induced rank is 512. The rank candidate may be calculated using the equation provided above. If so, then the rank candidate is 518 (0.75(previous rank candidate of 520)+0.25(induced rank of 512)). Since the difference between the rank candidate (518) and the neighboring rank (512) is within the rank threshold (6<20), the advertised rank is set to a new rank value of 512.

Figure 5:
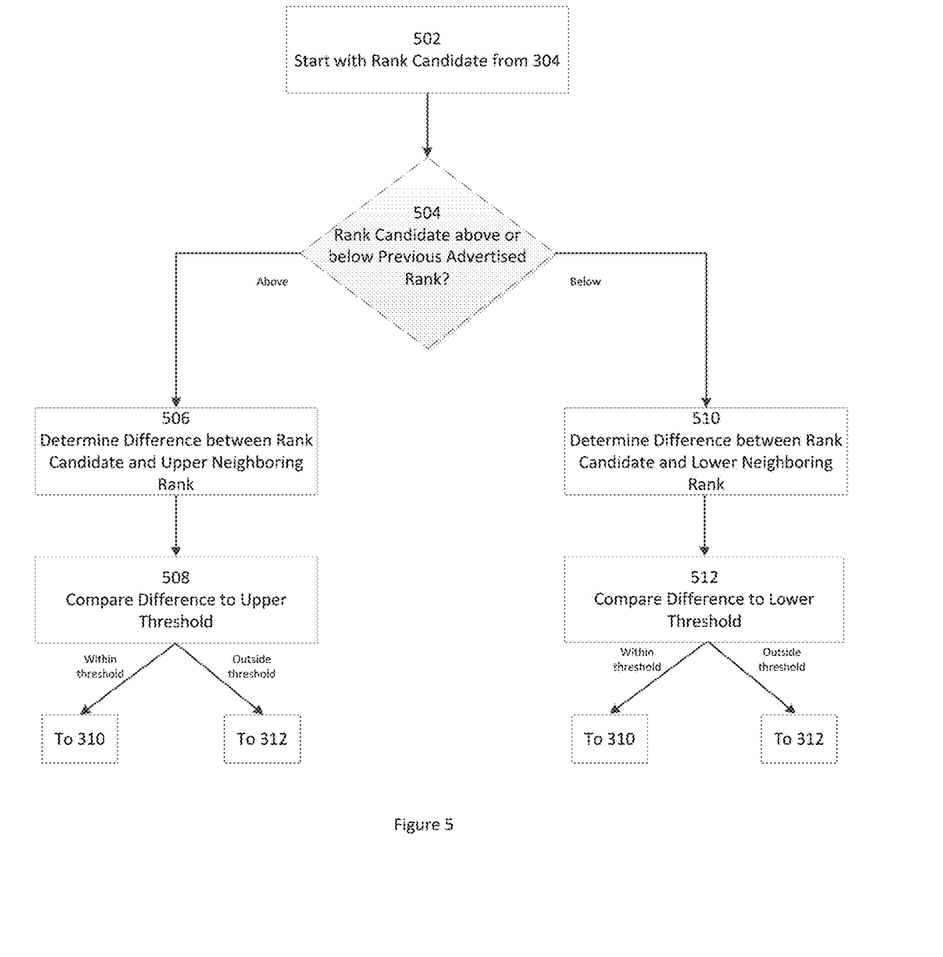
FIG. 5 is a flowchart illustrating an exemplary method of adjusting the advertised rank using an upper threshold and a lower threshold.

FIG. 4 illustrates that the advertised rank changes more slowly than the induced rank. Although FIG. 4 used the same rank threshold for a neighboring rank above the previous advertised rank or below the previous advertised rank, some implementations may use different rank thresholds. This is illustrated in FIG. 5. In this case, an upper threshold may be used to determine when to increase the advertised rank and a lower threshold may be used to determine when to decrease the advertised rank. In 502, this method starts with the rank candidate determined in step 304 in FIG. 3. In 504, the node evaluates whether the rank candidate is above or below the previous advertised rank. When the rank candidate is above the previous advertised rank, the node proceeds to 506 and determines the difference between the rank candidate and the upper neighboring rank. At 508, the node compares the difference calculated in 506 to the upper threshold. When the difference is within the upper threshold, the node proceeds to step 310 in FIG. 3. When the difference is outside of the upper threshold, the node proceeds to step 312 in FIG. 3. In this example, the advertised rank is only changed when the rank candidate is within the upper threshold.

When the rank candidate is below the previous advertised rank in 504, the node proceeds to 510 and determines the difference between the rank candidate and the lower neighboring rank. At 512, the node compares the difference from 510 to the lower threshold. If the difference is within the lower threshold, the node proceeds to step 310 in FIG. 3. If the difference is outside of the lower threshold, the node proceeds to step 312 in FIG. 3. The advertised rank is only changed when the rank candidate is within the lower threshold.

Link Quality Indicator

Link Quality Indicator (LQI) is an indicator of the RF signal quality between a node and a neighboring node. Each packet that a node receives from a neighboring node has an associated LQI. The LQI may be based on the signal to noise ratio (SNR) and the packet success rate. In one system each time a frame is received from a neighboring node, the SNR is recorded. The node includes a translation table that is based upon the RF characteristics of the node's transceiver hardware. The translation table is used to convert the SNR to LQI so that a "good" SNR value is translated to a "good" LQI value for RPL. The LQI scale is consistent in RPL across hardware platforms, whereas the translation tables are adapted for the different hardware platforms used by the nodes. Some systems use packet success rate. One way that packet success rate may be used is to adjust the LQI based on packet success rate. For example, if the SNR value is "good", but the packet success rate is bad, then the translation table provides a "good" LQI value, but the packet success rate adjusts the LQI value so that it is not quite as "good". In this manner, the LQI reflects both SNR and other factors that affect packet success rate.

Since a node is likely to receive more packets from certain nodes, e.g., its parent, there may be significant variations in the number of packets used to calculate LQI values for different nodes. To account for the different number of packets received from different nodes, a running average calculation may be used. An average LQI is determined over a predetermined time period by adding the LQI values for the packets received from a node during the time period and dividing the total by the number of received packets. A running average LQI is determined by a weighted sum of the average LQI and the previous running average LQI. In one example, the following is used:

LQI(running average)=(¾*LQI(previous running average))+(¼*LQI(average)).

If the node does not receive any packets from one of its neighboring nodes during the time period, then the average LQI for the previous time period may be used. The time period used to calculate the average LQI may be independent of when the node communicates its advertised rank.

Figure 6:
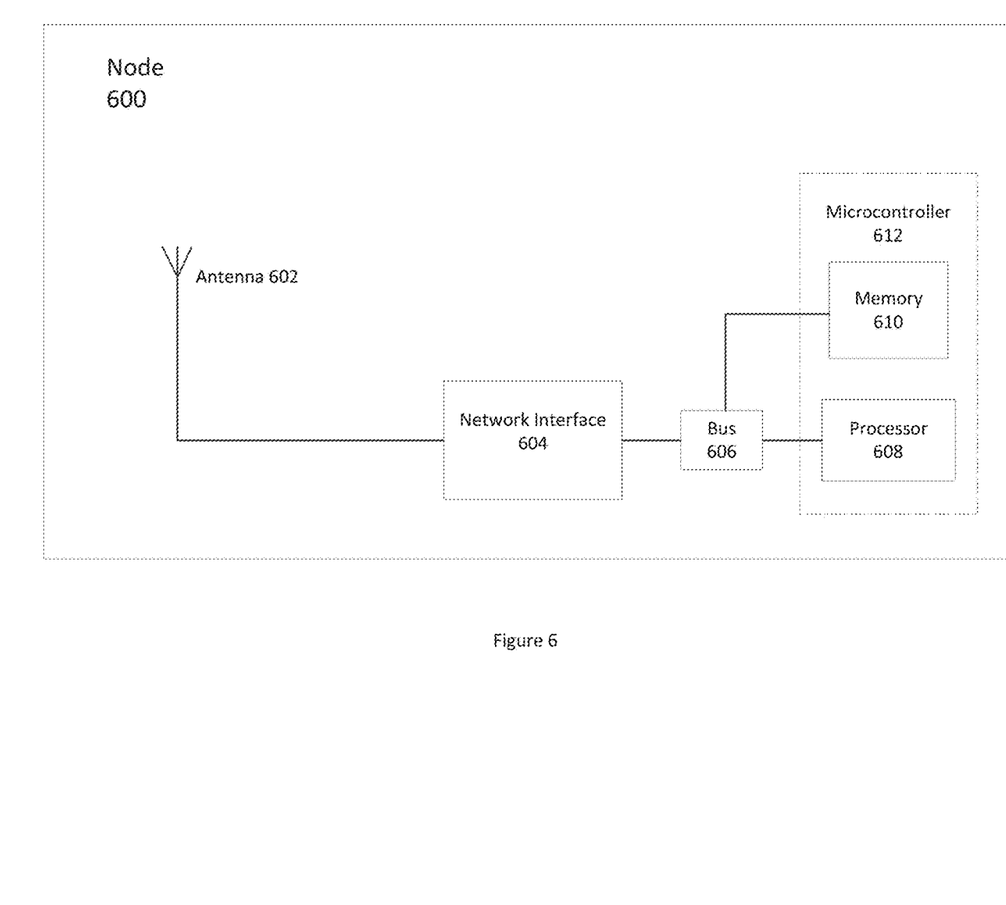
FIG. 6 is a block diagram illustrating an exemplary node.

FIG. 6 illustrates an exemplary node that may be used in the network of FIG. 1. In one example, a node can include a meter located at a premises, which measures the consumption of a resource such as gas, water, or electric power. Such a meter can be part of an RF network used for AMI. Other examples of nodes include a router, collector or collection point, host computer, hub, or other electronic device that is attached to a network and is capable of sending, receiving, or forwarding information over a communication channel.

A node 600 may include a network interface 604 and an antenna 602 so that it may communicate with like nodes and/or other devices in the mesh network. A network interface 604 may communicate with the microcontroller 612 using the bus 606, which enables the node to function like a computer, carrying out computer and command functions to provide implementations of the present invention described herein. The microcontroller 612 may include a processor 608 and a storage medium, such as memory 610. The processor 608 can be any suitable processing device or group of devices configured to execute instructions stored in the memory.

The memory 610 can be any suitable non-transitory computer-readable medium for providing computer-executable program instructions, such as firmware or other operating instructions for controlling one or more hardware components of a node, to the processor 608. Examples of a non-transitory computer-readable medium may include, but are not limited to, a memory chip, ROM, RAM, an ASIC, a configured processor, electronic storage, optical storage, magnetic storage, or other storage device from which a computer processor can read instructions. The instructions may include processor-specific instructions generated by a compiler and/or an interpreter from code written in any suitable computer-programming language. The memory may be located internal to the node or accessible by the node via a network, for example. A node may also include a crystal oscillator (i.e. a clock) to provide timekeeping and an energy storage device (i.e. a battery) to provide back-up power. Some nodes may be powered only by an energy storage device. Some nodes include additional components, such as a utility meter that measures the consumption of a resource or service.

General Considerations

The foregoing is provided for purposes of illustrating, describing, and explaining aspects of the present invention and is not intended to be exhaustive or to limit the invention to the precise forms disclosed. Further modifications and adaptations of these embodiments will be apparent to those skilled in the art and may be made without departing from the scope and spirit of the invention. For example, different weighting factors may be used to determine the rank candidate or the running average LQI. Additional factors may also be used to determine induced rank or LQI. Different arrangements of the components described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this application.

What is claimed is:

1. A method for communicating an advertised rank of a node in a mesh network, comprising:
   receiving an advertised rank of a parent node of the node;
   determining an induced rank of the node, wherein the induced rank is based on the advertised rank of the parent node and a Link Quality Indicator (LQI) adjustment for a link between the node and the parent node;
   determining a rank candidate for the node based on the induced rank and a previous rank candidate for the node, wherein the previous rank candidate was determined in connection with a previous advertised rank of the node;
   comparing the rank candidate and a neighboring rank for the node, wherein the neighboring rank is an adjacent rank value to the previous advertised rank of the node;
   when the rank candidate is within a rank threshold of the neighboring rank, then determining that the advertised rank is the neighboring rank;
   when the rank candidate is outside the rank threshold of the neighboring rank, then determining that the advertised rank is the previous advertised rank; and
   communicating the advertised rank to other nodes in the mesh network.

2. The method of claim 1, wherein the LQI adjustment is equal to at least one rank value, and determining an induced rank comprises summing the advertised rank of the parent node, the at least one rank value for the LQI adjustment, and one rank value.

3. The method of claim 1, wherein the LQI for the link between the parent node and the node is a weighted sum of an average LQI for a time period and a running average LQI for a previous time period.

4. The method of claim 1, wherein the rank threshold has one value when the neighboring rank is above the previous advertised rank and another value when the neighboring rank is below the previous advertised rank.

5. The method of claim 1, wherein the rank candidate is a weighted sum of the induced rank and the previous rank candidate.

6. The method of claim 1, wherein communicating the advertised rank to other nodes in the mesh network comprises including the advertised rank in a DODAG Information Object (DIO) message.

7. A method for communicating an advertised rank of a node in a mesh network, comprising:
   determining an induced rank of the node, wherein the induced rank is based on a rank of a parent node of the node and a Link Quality Indicator (LQI) for a link between the node and the parent node;
   determining a rank candidate for the node based on the induced rank and a previous rank candidate for the node, wherein the previous rank candidate was determined in connection with a previous advertised rank of the node;
   comparing the rank candidate and a neighboring rank for the node, wherein the neighboring rank and the previous advertised rank are adjacent rank values;
   when the rank candidate is within a rank threshold of the neighboring rank, then determining that the advertised rank is the neighboring rank;

when the rank candidate is outside the rank threshold of the neighboring rank, then determining that the advertised rank is the previous advertised rank; and communicating the advertised rank to other nodes in the mesh network.

8. The method of claim 7, wherein determining the rank candidate for the node based on the induced rank and the previous rank candidate for the node, further comprises:

determining that the rank candidate is equal to a weighted sum of the previous rank candidate and the induced rank, wherein a weight associated with the previous rank candidate is greater than the weight associated with the induced rank.

9. The method of claim 7, wherein communicating the advertised rank to other nodes in the mesh network comprises transmitting a DIO (DODAG Information Object) message.

10. The method of claim 7, wherein the rank threshold has one value when the neighboring rank is above the previous advertised rank and another value when the neighboring rank is below the previous advertised rank.

11. The method of claim 7, wherein determining the induced rank of the node is performed more often than determining the rank candidate.

12. The method of claim 7, wherein communicating the advertised rank to other nodes in the mesh network comprises broadcasting the advertised rank in the mesh network.

13. The method of claim 7, wherein the node determines the LQI for the link between the node and the parent node based on signal to noise ratio and packet success rate for communications with the parent node.

14. A method for determining an advertised rank of a node in a mesh network, comprising:

receiving a plurality of packets from a parent node of the node, wherein each packet has an associated Link Quality Indicator (LQI);

determining an induced rank of the node, wherein the induced rank is based on a rank of the parent node and an LQI adjustment based on a running average LQI;

determining a rank candidate for the node based on the induced rank and a previous rank candidate for the node, wherein the previous rank candidate was determined in connection with a previous advertised rank of the node;

comparing the rank candidate and a neighboring rank for the node, wherein the neighboring rank and the previous advertised rank are adjacent rank values;

when the rank candidate is within a rank threshold of the neighboring rank, then determining that the advertised rank is the neighboring rank;

when the rank candidate is outside the rank threshold of the neighboring rank, then determining that the advertised rank is the previous advertised rank; and communicating the advertised rank to other nodes in the mesh network.

15. The method of claim 14, wherein the plurality of packets are received during a time period, an average LQI is determined using the LQIs for the received packets, and a previous running average LQI was determined during a prior time period, and the running average LQI is a weighted sum of the average LQI and the previous running average LQI.

16. The method of claim 14, wherein the LQI adjustment is zero when the running average LQI is below a threshold value, the LQI adjustment is one rank value when the running average LQI is between the threshold and a first value, and the LQI adjustment is two rank values when the running average LQI is above the first value.

17. The method of claim 14, wherein determining an induced rank comprises summing the advertised rank of the parent node, the LQI adjustment, and one rank value.

18. The method of claim 14, wherein the rank threshold has one value when the neighboring rank is above the previous advertised rank and another value when the neighboring rank is below the previous advertised rank.

19. The method of claim 14, further comprising:

translating a signal to noise ratio for a frame received from the parent node to the LQI using a translation table.

20. The method of claim 14, wherein the LQI is based in part on a packet success rate.

* * * * *